(12) United States Patent
Kagami et al.

(10) Patent No.: US 11,332,194 B2
(45) Date of Patent: May 17, 2022

(54) VEHICLE BODY STRUCTURE

(71) Applicant: Toyota Jidosha Kabushiki Kaisha, Toyota (JP)

(72) Inventors: Ayaka Kagami, Inazawa (JP); Soshiro Murata, Nagoya (JP); Takashi Sagisaka, Miyoshi (JP); Takahiro Tashiro, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 193 days.

(21) Appl. No.: 16/747,804

(22) Filed: Jan. 21, 2020

(65) Prior Publication Data

US 2020/0239080 A1    Jul. 30, 2020

(30) Foreign Application Priority Data

Jan. 25, 2019    (JP) .............................. JP2019-011706

(51) Int. Cl.
| | |
|---|---|
| *B62D 21/15* | (2006.01) |
| *B62D 27/02* | (2006.01) |
| *B62D 25/20* | (2006.01) |
| *B62D 21/02* | (2006.01) |
| *B62D 21/08* | (2006.01) |

(52) U.S. Cl.
CPC ........... *B62D 21/157* (2013.01); *B62D 21/02* (2013.01); *B62D 21/08* (2013.01); *B62D 25/2036* (2013.01); *B62D 27/02* (2013.01)

(58) Field of Classification Search
CPC .. B62D 21/157; B62D 27/02; B62D 25/2036; B62D 21/02; B62D 21/08

USPC ..... 296/29, 30, 204, 193.07, 203.03, 187.12
See application file for complete search history.

(56) References Cited

U.S. PATENT DOCUMENTS

| | | | |
|---|---|---|---|
| 10,377,218 B1* | 8/2019 | Pachore | ................. B62D 25/08 |
| 2012/0181809 A1 | 7/2012 | Kuhl et al. | |
| 2017/0057558 A1* | 3/2017 | Hillebrecht | ............... B22F 5/10 |
| 2020/0031087 A1* | 1/2020 | Miura | ....................... B32B 3/12 |
| 2021/0293455 A1* | 9/2021 | Au | ........................ F24S 30/425 |

FOREIGN PATENT DOCUMENTS

JP        2013-506588 A     2/2013

* cited by examiner

*Primary Examiner* — D Glenn Dayoan
*Assistant Examiner* — E Turner Hicks
(74) *Attorney, Agent, or Firm* — Dinsmore & Shohl LLP

(57) ABSTRACT

A vehicle body structure including: a pair of left and right first vehicle body framework members manufactured by die-casting, and being provided at vehicle width direction outer sides of a vehicle and extending along a vehicle front-rear direction; a pair of left and right second vehicle body framework members manufactured from sheet steel and being joined to a length direction end portion of a corresponding first vehicle body framework member and extending along the vehicle front-rear direction; and a load transmission portion provided at either the first vehicle body framework members or the second vehicle body framework members, the load transmission portion configured to abut the other the first vehicle body framework members or the second vehicle body framework members when a collision load acting substantially along the vehicle front-rear direction is input to the first vehicle body framework members or the second vehicle body framework members.

11 Claims, 13 Drawing Sheets

FIG.3
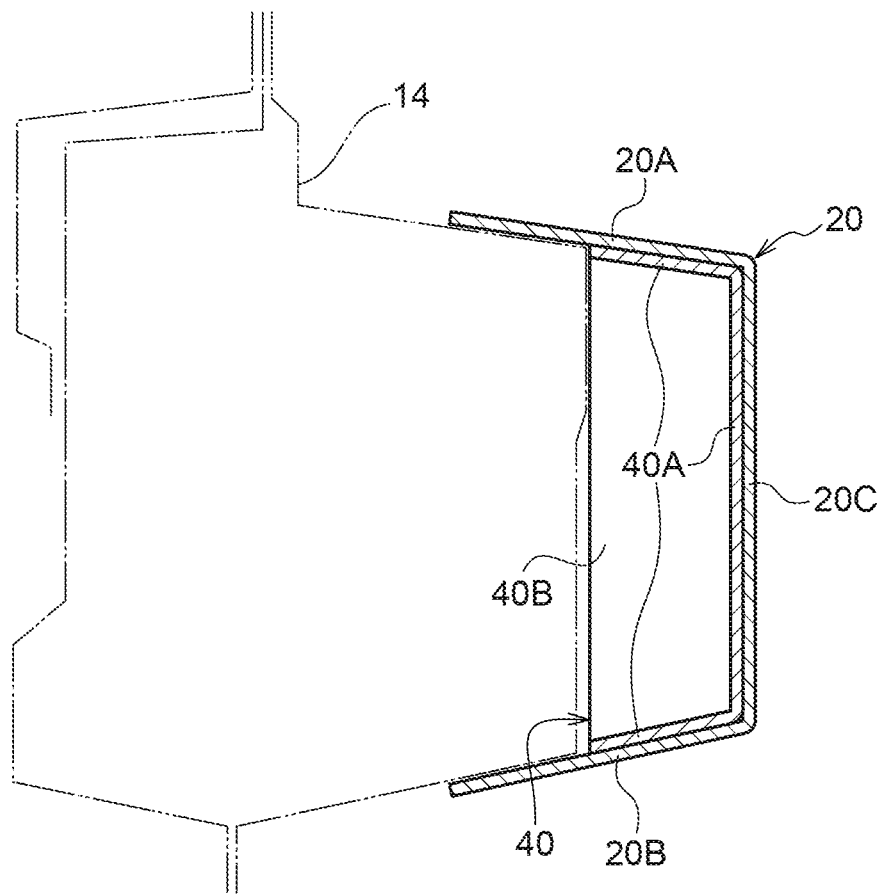
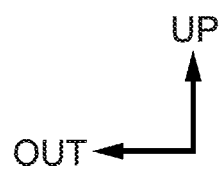

FIG.6
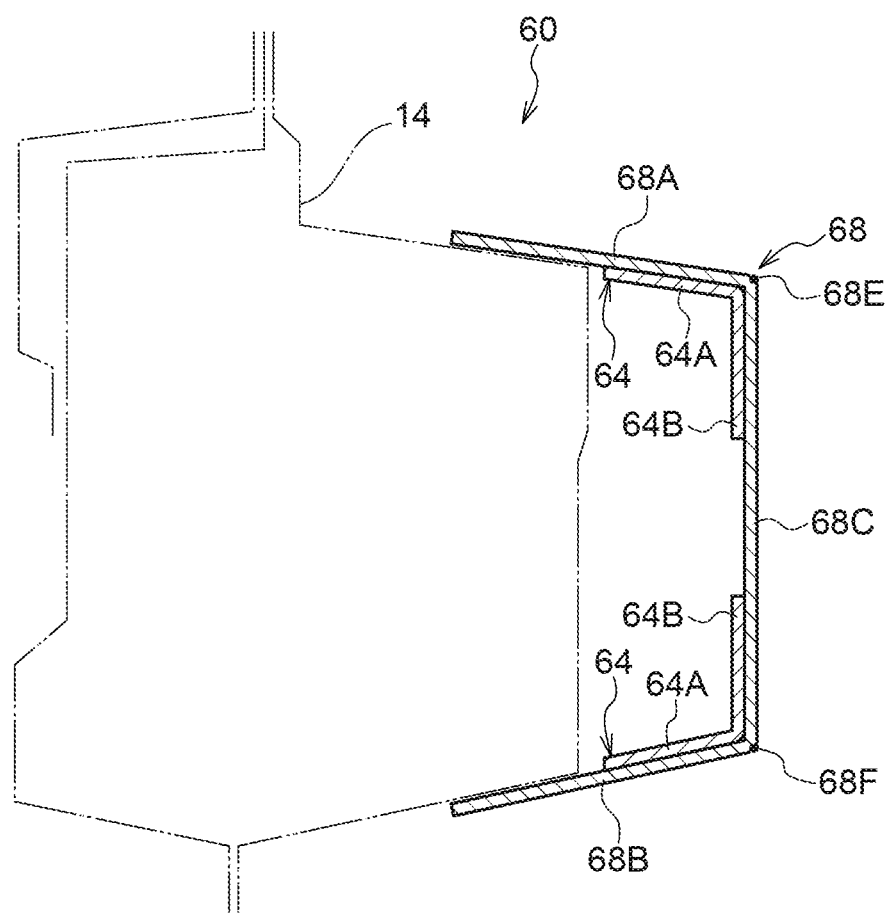
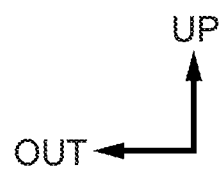

FIG.9
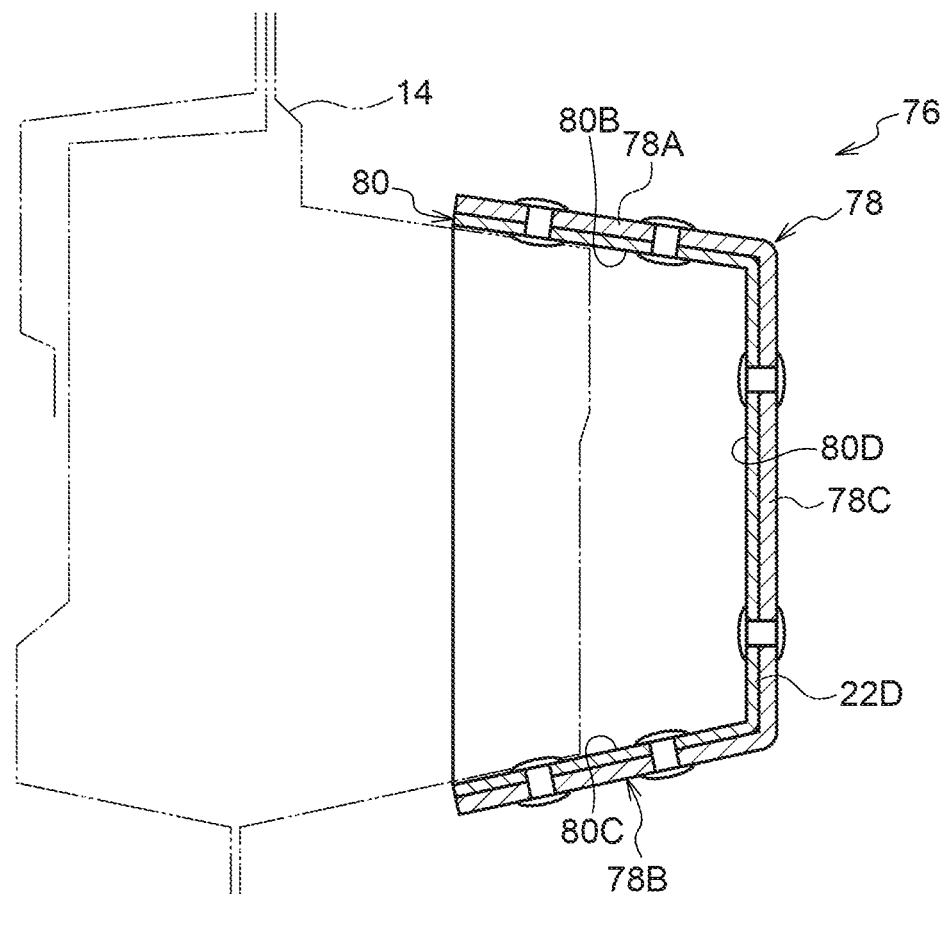
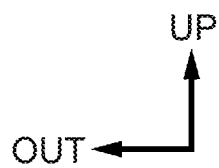

FIG.12
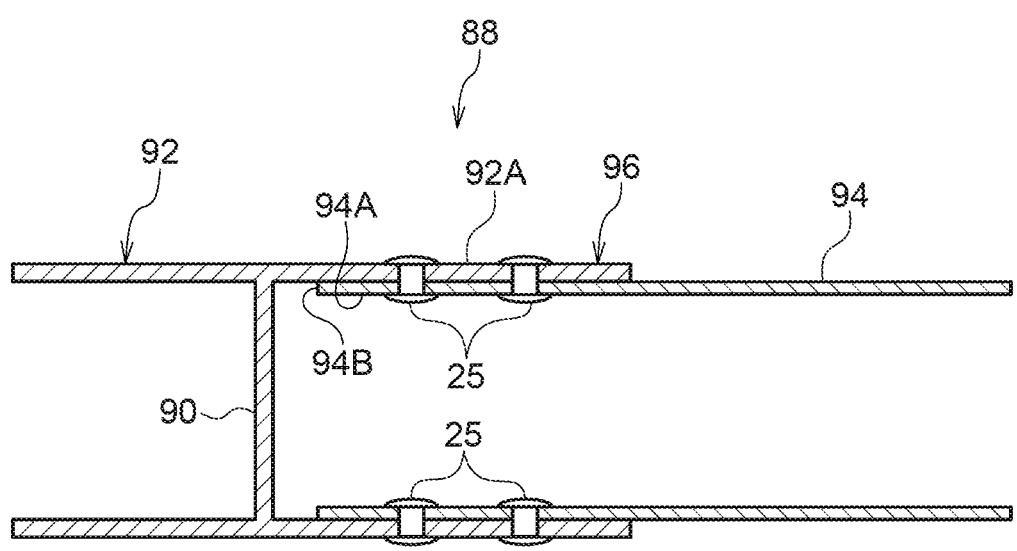
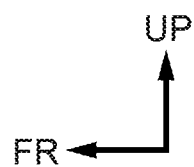

FIG.13
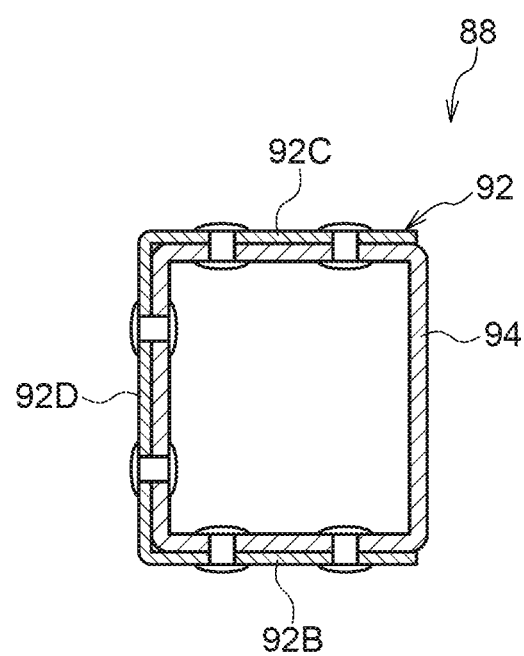
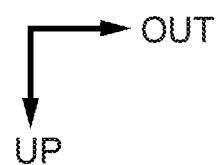

VEHICLE BODY STRUCTURE

CROSS-REFERENCE TO RELATED APPLICATION

This application claims priority under 35 USC 119 from Japanese Patent Application No. 2019-011706, filed on Jan. 25, 2019, the disclosure of which is incorporated by reference herein.

BACKGROUND

Technical Field

The present disclosure relates to a vehicle body structure.

Related Art

Japanese Patent Application Laid-Open (JP-A) No. 2013-506588, discloses a vehicle body structure. This vehicle body structure includes a side member provided at a vehicle width direction outer side of a rear section of a vehicle, so as to extend along a vehicle front-rear direction. This side member is formed from die-cast aluminum, and so raises the bending rigidity of the vehicle body.

However, in cases in which a side member is formed from die-cast aluminum as in the vehicle body structure disclosed in JP-A No. 2013-506588, although the bending rigidity is higher than sheet steel, the brittleness is also higher. Accordingly, in a vehicle side-on collision (referred to hereafter simply as "side collision"), in particular a side collision such as what is referred to as pole collision in which collision load is focused on one region of the vehicle, there is a possibility that the side member might fail, generating fragments that might affect nearby vehicle components (a fuel tank or the like). It is thus desirable to configure locations of the side member that are particularly likely to affect vehicle components from sheet steel. However, when collision load is input to a join location between a die-cast location and a sheet steel location, there is a possibility that the join might come apart, causing the sheet steel location to move greatly with respect to the die-cast location, resulting in heavy deformation of the overall vehicle body. The vehicle body structure disclosed in JP-A No. 2013-506588, thus leaves room for improvement in this respect.

SUMMARY

The present disclosure provides a vehicle body structure that may suppress deformation of a vehicle body in a vehicle collision.

A first aspect of the present disclosure is a vehicle body structure including: a pair of left and right first vehicle body framework members manufactured by die-casting, the pair of left and right first vehicle body framework members being provided at vehicle width direction outer sides of a vehicle and extending along a vehicle front-rear direction; a pair of left and right second vehicle body framework members manufactured from sheet steel, the pair of left and right second vehicle body framework members being joined to a length direction end portion of a corresponding first vehicle body framework member and extending along the vehicle front-rear direction; and a load transmission portion provided at either the first vehicle body framework members or the second vehicle body framework members, the load transmission portion configured to abut the other the first vehicle body framework members or the second vehicle body framework members when a collision load acting substantially along the vehicle front-rear direction is input to the first vehicle body framework members or the second vehicle body framework members.

In the first aspect of the present disclosure, the load transmission portion is provided to the first vehicle body framework members or the second vehicle body framework members. When collision load input substantially along the vehicle front-rear direction is input to at least one member type out of the first vehicle body framework members or the second vehicle body framework members, the load transmission portion abuts the other member type out of the first vehicle body framework members or the second vehicle body framework members. Namely, in a vehicle collision, in particular a vehicle rear-end collision (referred to hereafter simply as "rear collision"), collision load acting substantially along the vehicle front-rear direction is input to the first vehicle body framework members or the second vehicle body framework members. When this occurs, stress is focused on a join location between each of the first vehicle body framework members and the corresponding second vehicle body framework member, this being a boundary between different members, which might cause the join to come apart. Were the join to come apart, the second vehicle body framework member and the corresponding first vehicle body framework member would attempt to displace relatively toward each other, which could cause heavy deformation of the overall vehicle body. However, in the present disclosure, the other out of the first vehicle body framework members or the second vehicle body framework members abuts the load transmission portion, enabling further relative movement between the first vehicle body framework members and the second vehicle body framework members to be suppressed.

In a second aspect of the present disclosure, in the first aspect, each of the second vehicle body framework members may be joined to a length direction end portion of the corresponding first vehicle body framework member to cover at least a portion of the end portion of the first vehicle body framework member, the load transmission portion may be provided at the second vehicle body framework member, at a side away from the first vehicle body framework member relative to a position where the first vehicle body framework member is joined to the second vehicle body framework member, and may be provided inside a cross-section of the second vehicle body framework member as sectioned orthogonally to a length direction of the second vehicle body framework member, and the load transmission portion may include joint portions joined to a plurality of at least two wall portions configuring the second vehicle body framework member as viewed in this cross-section, and an abutting portion that links the joint portions together.

In the second aspect of the present disclosure, the load transmission portion is provided inside the cross-section of each of the second vehicle body framework members as sectioned orthogonally to the length direction of the second vehicle body framework member. Thus, when the join comes apart at the join location between the first vehicle body framework member and the corresponding second vehicle body framework member in a rear collision, an end face of the first vehicle body framework member is capable of abutting the load transmission portion inside the cross-section of the second vehicle body framework member that is joined to the length direction end portion of the first vehicle body framework member so as to cover at least a portion of the length direction end portion. Accordingly, Any further relative movement between the first vehicle body framework member and the second vehicle body framework member may be suppressed. Moreover, since any change to the cross-section profile of the second vehicle body framework member is suppressed by the load transmission portion that includes the abutting portion linking the joint portions together, deformation of the cross-section of the second vehicle body framework member during the input of collision load is suppressed, enabling collision load to be efficiently transmitted between the first vehicle body framework member and the second vehicle body framework member through the load transmission portion.

In a third aspect of the present disclosure, in the second aspect, the joint portions of the load transmission portion may be provided at a side away from the first vehicle body framework member relative to the abutting portion.

In the third aspect of the present disclosure, the joint portions of the load transmission portion are provided at the side away from the first vehicle body framework member relative to the abutting portion. Namely, since the abutting portion can be disposed closer to the first vehicle body framework member, the first vehicle body framework member abuts the abutting portion of the load transmission portion promptly when the join comes apart at the join location between the first vehicle body framework member and the second vehicle body framework member in a rear collision. This thereby may enable relative movement between the first vehicle body framework member and the second vehicle body framework member to be further suppressed.

In a fourth aspect of the present disclosure, in the first aspect, each of the second vehicle body framework members may be configured with a closed cross-section structure, and is joined to a length direction end portion of the corresponding first vehicle body framework member to cover at least a portion of the end portion of the first vehicle body framework member, and the load transmission portion may be provided at the corresponding first vehicle body framework member, at a side away from the second vehicle body framework member relative to a position where the second vehicle body framework member is joined to the first vehicle body framework member, and may be provided outside a cross-section of the first vehicle body framework member as sectioned orthogonally to a length direction of the first vehicle body framework member.

In the fourth aspect of the present disclosure, the load transmission portion is provided outside the cross-section of each of the first vehicle body framework members as sectioned orthogonally to the length direction of the first vehicle body framework member. Thus, when the join comes apart at the join location between the first vehicle body framework member and the corresponding second vehicle body framework member in a rear collision, an end face of the second vehicle body framework member that is joined to the length direction end portion of the first vehicle body framework member so as to cover at least a portion of the length direction end portion is capable of abutting the load transmission portion. Accordingly, any further relative movement between the first vehicle body framework member and the second vehicle body framework member may be suppressed. Moreover, since the second vehicle body framework member is configured with a closed cross-section structure, the cross-section profile thereof is suppressed from changing when subjected to collision load. This may enable collision load to be transmitted efficiently between the first vehicle body framework member and the second vehicle body framework member through the load transmission portion.

In a fifth aspect of the present disclosure, in the first aspect or the fourth aspect, each of the second vehicle body framework members may be joined to a length direction end portion of the corresponding first vehicle body framework member to cover at least a portion of the end portion of the first vehicle body framework member, the load transmission portion may be provided at the corresponding first vehicle body framework member, at a side away from the second vehicle body framework member relative to a position where the second vehicle body framework member is joined to the first vehicle body framework member, and may be provided outside a cross-section of the first vehicle body framework member as sectioned orthogonally to a length direction of the first vehicle body framework member, and a reinforcement member may be joined to the second vehicle body framework member at a location corresponding to at least one ridge line of the second vehicle body framework member.

In the fifth aspect of the present disclosure, the load transmission portion is provided outside the cross-section of each of the first vehicle body framework members as sectioned orthogonally to the length direction of the first vehicle body framework member. Thus, when the join comes apart at the join location between the first vehicle body framework member and the corresponding second vehicle body framework member in a rear collision, an end face of the second vehicle body framework member that is joined to the length direction end portion of the first vehicle body framework member to so as to cover at least a portion of the length direction end portion is capable of abutting the load transmission portion. Accordingly, any further relative movement between the first vehicle body framework member and the second vehicle body framework member may be suppressed. Moreover, the reinforcement member is joined to the second vehicle body framework member at the location corresponding to at least one ridge line of the second vehicle body framework member, such that deformation of the ridge line is suppressed. Accordingly, collision load passing through the load transmission portion located between the first vehicle body framework member and the second vehicle body framework member can be transmitted through the ridge line, which has higher bending rigidity than other locations, thereby may enable collision load to be transmitted efficiently.

In a sixth aspect of the present disclosure, in the first aspect, each of the first vehicle body framework members may be joined to a length direction end portion of the corresponding second vehicle body framework member configured with a closed cross-section structure to cover at least a portion of the end portion of the second vehicle body framework member; and the load transmission portion may be provided to the corresponding first vehicle body framework member at a side away from the second vehicle body framework member relative to a position where the second vehicle body framework member is joined to the first vehicle body framework member, and may be provided inside a cross-section of the first vehicle body framework member as sectioned orthogonally to a length direction of the first vehicle body framework member.

In the sixth aspect of the present disclosure, the load transmission portion is provided inside the cross-section of each of the first vehicle body framework members as sectioned orthogonally to the length direction of the first vehicle body framework member. Thus, when the join comes apart at the join location between the first vehicle body framework member and the corresponding second vehicle body framework member in a rear collision, an end face of the second vehicle body framework member that is joined to the length direction end portion of the first vehicle body framework member so as to be covered by at least a portion of the length direction end portion is capable of abutting the load transmission portion. Accordingly, any further relative movement between the first vehicle body framework member and the second vehicle body framework member may be suppressed. Moreover, since the second vehicle body framework member is configured with a closed cross-section structure, the cross-section profile thereof may be suppressed from changing when subjected to collision load. This may enable the collision load to be transmitted efficiently between the first vehicle body framework member and the second vehicle body framework member through the load transmission portion.

According to the first aspect, the vehicle body structure of the present disclosure may suppress deformation of the vehicle body in a vehicle collision.

Further, according to the second aspect to the sixth aspect exhibit, the vehicle body structures of the present disclosure may further suppress deformation of the vehicle body in a vehicle collision.

BRIEF DESCRIPTION OF THE DRAWINGS

Exemplary embodiments will be described in detail based on the following figures, wherein:

FIG. 3 is a cross-sectional view illustrating a state sectioned along line B-B in FIG. 1;

FIG. 6 is a cross-sectional view corresponding to FIG. 3, illustrating a vehicle body structure according to a second exemplary embodiment;

FIG. 9 is a cross-sectional view corresponding to FIG. 2, illustrating a vehicle body structure according to the third exemplary embodiment;

FIG. 12 is a cross-sectional view corresponding to FIG. 10, illustrating a vehicle body structure according to a fifth exemplary embodiment; and FIG. 13 is a cross-sectional view corresponding to FIG. 11, illustrating a vehicle body structure according to the fifth exemplary embodiment.

DETAILED DESCRIPTION

First Exemplary Embodiment

Figure 1:
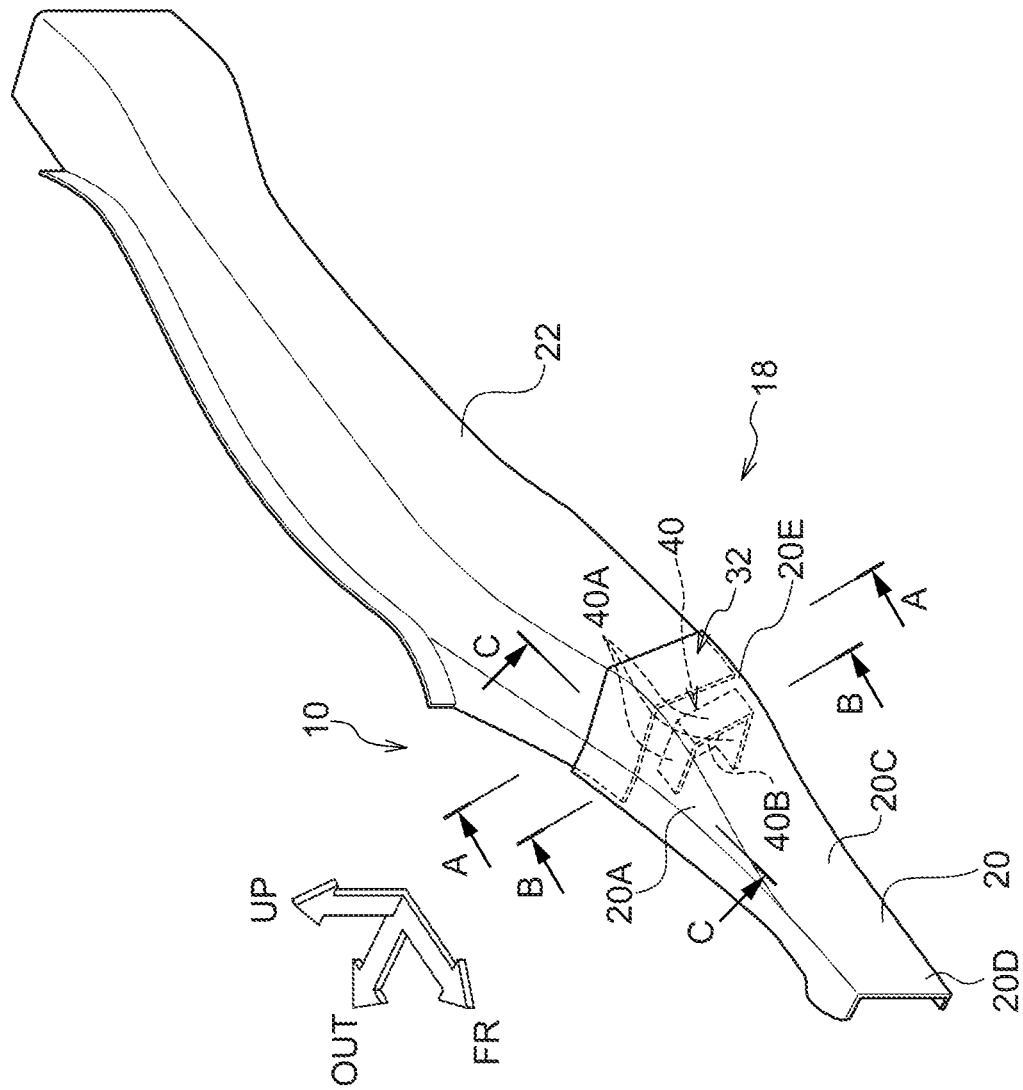
FIG. 1 is a schematic perspective view illustrating a first vehicle body framework member and a second vehicle body framework member of a vehicle body structure according to a first exemplary embodiment when viewed from a vehicle compartment interior.

Explanation follows regarding a vehicle body structure 10 of the present disclosure, with reference to FIG. 1 to FIG. 5. The arrow FR, the arrow UP, and the arrow OUT in the drawings respectively indicate a forward direction (direction of travel), upward direction, and vehicle width direction outer side of the vehicle as appropriate. In the following explanation, unless specifically stated otherwise, reference simply to front and rear, left and right, and up and down directions refers to front and rear in a vehicle front-rear direction, left and right in a vehicle left-right direction (vehicle width direction), and up and down in a vehicle vertical direction.

Figure 5:
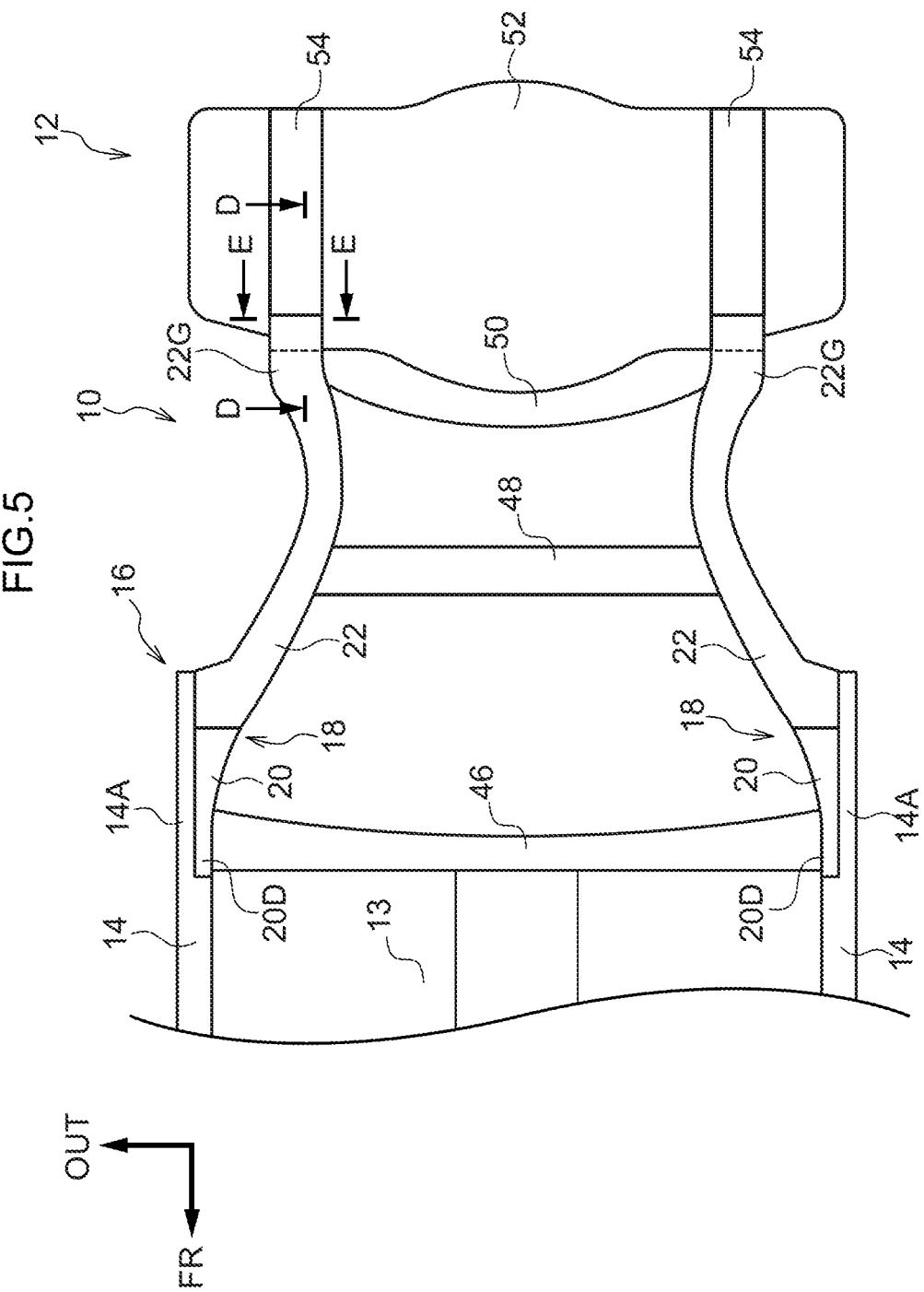
FIG. 5 is a bottom face view when viewed from a vehicle lower side of a vehicle provided with a vehicle body structure according to the first exemplary embodiment.

As illustrated in FIG. 5, side sections of a vehicle 12 are provided with left and right rockers 14 extending along the vehicle front-rear direction. Each of the left and right rockers 14 has a closed cross-section profile as sectioned along directions orthogonal to the length direction of the rocker 14 (i.e. the vehicle vertical direction and the vehicle width direction) and configures part of a framework of a vehicle body 16.

A floor panel 13 extending along the vehicle front-rear direction and the vehicle width direction and configuring a floor surface of a vehicle compartment interior (cabin) is provided between the left and right rockers 14. The two vehicle width direction end portions of the floor panel are joined to the respective left and right rockers 14.

A pair of left and right rear side members 18 are provided at the vehicle rear side and vehicle width direction inner side of the respective rockers 14. As illustrated in FIG. 1, each of the rear side members 18 is provided so as to extend along the vehicle front-rear direction and toward the vehicle upper side on progression toward the vehicle rear side. Each of the rear side member 18 includes a rear side member front portion 20 serving as a second vehicle body framework member configuring a vehicle front portion of the rear side member 18, and a rear side member rear portion 22 serving as a first vehicle body framework member configuring a vehicle rear portion of the rear side member 18. The rear side member front portion 20 and the rear side member rear portion 22 are joined together through a join location 32, described later.

Each of the rear side member front portions 20 is manufactured from sheet steel, and has a substantially U-shape cross-section profile opening toward the vehicle width direction outer side as sectioned orthogonally to its length direction. Specifically, the rear side member front portion 20 is configured including an upper wall portion 20A provided at the vehicle upper side with a thickness direction running substantially in the vehicle vertical direction, a lower wall portion 20B that opposes the upper wall portion 20A in the vehicle vertical direction, and a vehicle width direction inner wall portion 20C that couples a vehicle width direction inner end portion of the upper wall portion 20A and a vehicle width direction inner end portion of the lower wall portion 20B together substantially along the vehicle vertical direction (see FIG. 2). A front end portion 20D of the rear side member front portion 20 is superimposed on a rear end portion 14A of the corresponding rocker 14 (see FIG. 5) so as to cover the rear end portion 14A from the vehicle width direction inner side, and is joined thereto through a non-illustrated weld portion.

A load transmission portion 40 is provided to a rear end portion 20E of each of the rear side member front portions 20 on the side away from the rear side member rear portion 22 relative to the join location 32. The load transmission portion 40 includes joint portions 40A and an abutting portion 40B. As illustrated in FIG. 3, the joint portions 40A are respectively joined to the upper wall portion 20A, the vehicle width direction inner wall portion 20C, and the lower wall portion 20B of the corresponding rear side member front portion 20 through non-illustrated weld portions.

Figure 4:
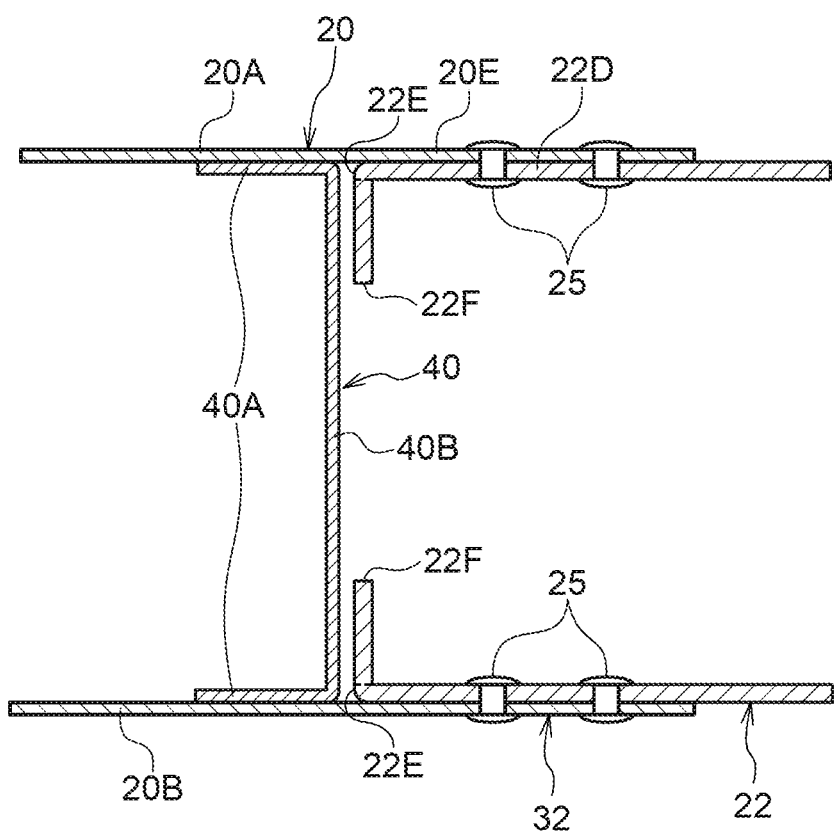
FIG. 4 is a cross-sectional view illustrating a state sectioned along line C-C in FIG. 1.

As illustrated in FIG. 4, the abutting portion 40B is provided so as to link together rear side member rear portion 22-side end portions of the joint portions 40A joined to the upper wall portion 20A, the vehicle width direction inner wall portion 20C (see FIG. 1) and the lower wall portion 20B of the corresponding rear side member front portion 20. The abutting portion 40B is formed in a substantially rectangular plate shape with its thickness direction substantially along the vehicle front-rear direction (see FIG. 3). In other words, the joint portions 40A are provided on the side away from the rear side member rear portion 22 relative to the abutting portion 40B, and the load transmission portion 40 is provided in the form of what is referred to as a bulkhead within the rear side member front portion 20.

As illustrated in FIG. 5, the pair of left and right rear side member front portions 20 are coupled together in the vehicle width direction by a center cross member 46 that configures the framework of a vehicle body lower section. As an example, the center cross member 46 is disposed at the vehicle lower side of the floor panel 13, and has a hat-shaped cross-section profile open toward the floor panel 13 as sectioned along the vehicle front-rear direction. The center cross member 46 is joined to a lower face of the floor panel 13 by welding or the like. A closed cross-section structure is thus configured between the center cross member 46 and the floor panel 13.

Figure 2:
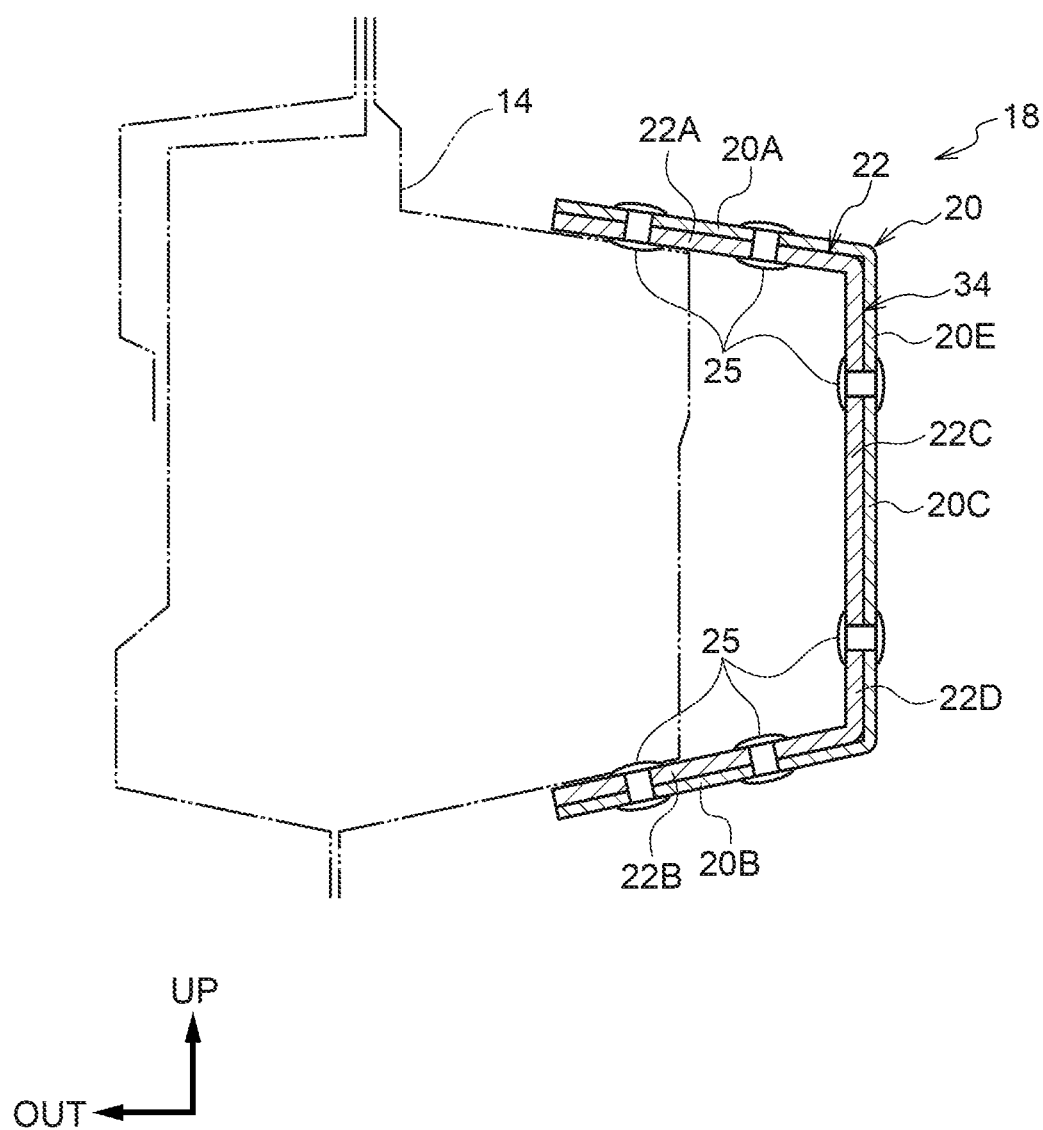
FIG. 2 is a cross-sectional view illustrating a state sectioned along line A-A in FIG. 1.

As illustrated in FIG. 2, each of the rear side member rear portions 22 is manufactured by die-casting and has a substantially U-shaped cross-section profile open toward the vehicle width direction outer side as sectioned orthogonally to its length direction, similarly to the rear side member front portion 20. Specifically, the rear side member rear portion 22 is configured including an upper wall portion 22A provided at the vehicle upper side with its thickness direction substantially along the vehicle vertical direction, a lower wall portion 22B opposing the upper wall portion 22A in the vehicle vertical direction, and a vehicle width direction inner wall portion 22C coupling a vehicle width direction inner end portion of the upper wall portion 22A and a vehicle width direction inner end portion of the lower wall portion 22B together substantially in the vehicle vertical direction. As illustrated in FIG. 4, the rear end portion 20E of the rear side member front portion 20 is superimposed on a front end portion 22D of the corresponding rear side member rear portion 22 so as to cover the front end portion 22D, and is joined thereto by plural self-piercing rivets (SPR) 25. In other words, a location where the front end portion 22D of the rear side member rear portion 22 and the rear end portion 20E of the rear side member front portion 20 are joined together corresponds to a join location 34.

As illustrated in FIG. 4, the front end portion 22D of each of the rear side member rear portions 22 is provided with flanges 22F that continue from an end face 22E of the rear side member rear portion 22 so as to project toward the interior of the cross-section of the rear side member rear portion 22, each flange 22F having its thickness direction substantially along the vehicle front-rear direction. As an example, the flanges 22F are respectively provided to the upper wall portion 22A, the vehicle width direction inner wall portion 22C, and the lower wall portion 22B of the rear side member rear portion 22, and the respective flanges 22F are joined together. Accordingly, the abutting portion 40B of the load transmission portion 40 opposes the end face 22E and the flanges 22F of the corresponding rear side member rear portion 22 in the vehicle front-rear direction.

The pair of left and right rear side member rear portions 22 are coupled together in the vehicle width direction by a first rear cross member 48 and a second rear cross member 50 that configure the framework of the vehicle body lower section. The first rear cross member 48 is provided at the vehicle rear side of the center cross member 46 described above. The first rear cross member 48 is disposed at the vehicle lower side of the floor panel 13 with its length direction along the vehicle width direction, and the two length direction end portions of the first rear cross member 48 are joined to substantially central portions of the rear side member rear portions 22 by welding or the like. As an example, the first rear cross member 48 is configured with a hat-shaped cross-section profile opening toward the floor panel 13 as sectioned along the vehicle front-rear direction, and is joined to the lower face of the floor panel 13 by welding or the like. A closed cross-section structure is thus configured between the first rear cross member 48 and the floor panel 13.

The second rear cross member 50 is provided at the vehicle rear side of the first rear cross member 48. The second rear cross member 50 is disposed at the vehicle lower side of the floor panel 13 with its length direction along the vehicle width direction, and the two length direction end portions of the second rear cross member 50 are joined to rear end portions 22G of the rear side member rear portions 22 by welding or the like. As an example, the second rear cross member 50 is configured with a hat-shaped cross-section profile opening toward the floor panel 13 as sectioned along the vehicle front-rear direction, and is joined to the lower face of the floor panel 13 by welding or the like. A closed cross-section structure is thus configured between the second rear cross member 50 and the floor panel 13.

Note that a pair of rear floor side members 54 that extend along the vehicle front-rear direction as far as a rear end of the vehicle body are joined to the rear end portions 22G of the respective rear side member rear portions 22. A rear floor panel 52 configuring a floor surface in a vehicle rear section is placed on the rear floor side members 54. The rear floor side members 54 will be described in detail later, in a fourth exemplary embodiment.

Explanation follows regarding operation of the first exemplary embodiment.

As illustrated in FIG. 4, in the present exemplary embodiment, the load transmission portion 40 is provided to one out of the rear side member rear portion 22 or the rear side member front portion 20. When collision load is input along the vehicle front-rear direction to at least one out of the rear side member rear portion 22 or the rear side member front portion 20, the load transmission portion 40 abuts the other out of the rear side member rear portion 22 or the rear side member front portion 20. Namely, in a vehicle collision, in particular in a rear collision, collision load is input substantially along the vehicle front-rear direction to at least one out of the rear side member rear portion 22 or the rear side member front portion 20. When this occurs, stress is focused on the join location 32 between the rear side member rear portion 22 and the rear side member front portion 20, this being a boundary between different members, which might cause the join to come apart. Were the join to come apart, the rear side member front portion 20 and the rear side member rear portion 22 would attempt to displace relatively toward each other, which could cause heavy deformation of the overall vehicle body 16. However, in the present exemplary embodiment, the other out of the rear side member rear portion 22 or the rear side member front portion 20 abuts the load transmission portion 40, enabling further relative movement between the rear side member rear portion 22 and the rear side member front portion 20 to be suppressed. This enables deformation of the vehicle body 16 in a vehicle collision to be suppressed.

The load transmission portion 40 provided to the rear side member front portion 20 is provided inside the cross-section of the rear side member front portion 20 as sectioned orthogonally to the length direction of the rear side member front portion 20. Accordingly, when the join comes apart at the join location 32 between the rear side member rear portion 22 and the rear side member front portion 20 in a rear collision, the end face 22E of the rear side member rear portion 22 is capable of abutting the load transmission portion 40 inside the cross-section of the rear side member front portion 20 that is joined to the front end portion 22D of the rear side member rear portion 22 so as to cover the front end portion 22D. Any further relative movement between the rear side member rear portion 22 and the rear side member front portion 20 may thereby be suppressed. Moreover, since any change to the cross-section profile of the rear side member front portion 20 may be suppressed by the load transmission portion 40 that includes the abutting portion 40B linking the joint portions 40A together, deformation of the cross-section of the rear side member front portion 20 during the input of collision load may be suppressed, and may enable the collision load to be efficiently transmitted between the rear side member rear portion 22 and the rear side member front portion 20 through the load transmission portion 40.

Moreover, the joint portions 40A of the load transmission portion 40 are provided on the side away from the rear side member rear portion 22 relative to the abutting portion 40B. Namely, since the abutting portion 40B can be disposed closer to the rear side member rear portion 22, the rear side member rear portion 22 abuts the abutting portion 40B of the load transmission portion 40 promptly when the join comes apart at the join location 32 between the rear side member rear portion 22 and the rear side member front portion 20 in a rear collision. This thereby may enable relative movement between the rear side member rear portion 22 and the rear side member front portion 20 to be further suppressed. Accordingly, deformation of the vehicle body 16 in a vehicle collision may be further suppressed.

Note that although the rear end portion 20E of the rear side member front portion 20 is configured so as to cover the front end portion 22D of the corresponding rear side member rear portion 22 in the present exemplary embodiment, there is no limitation thereto. At least a portion of the rear end portion 20E of the rear side member front portion 20 may cover the front end portion 22D of the rear side member rear portion 22.

Second Exemplary Embodiment

Figure 7:
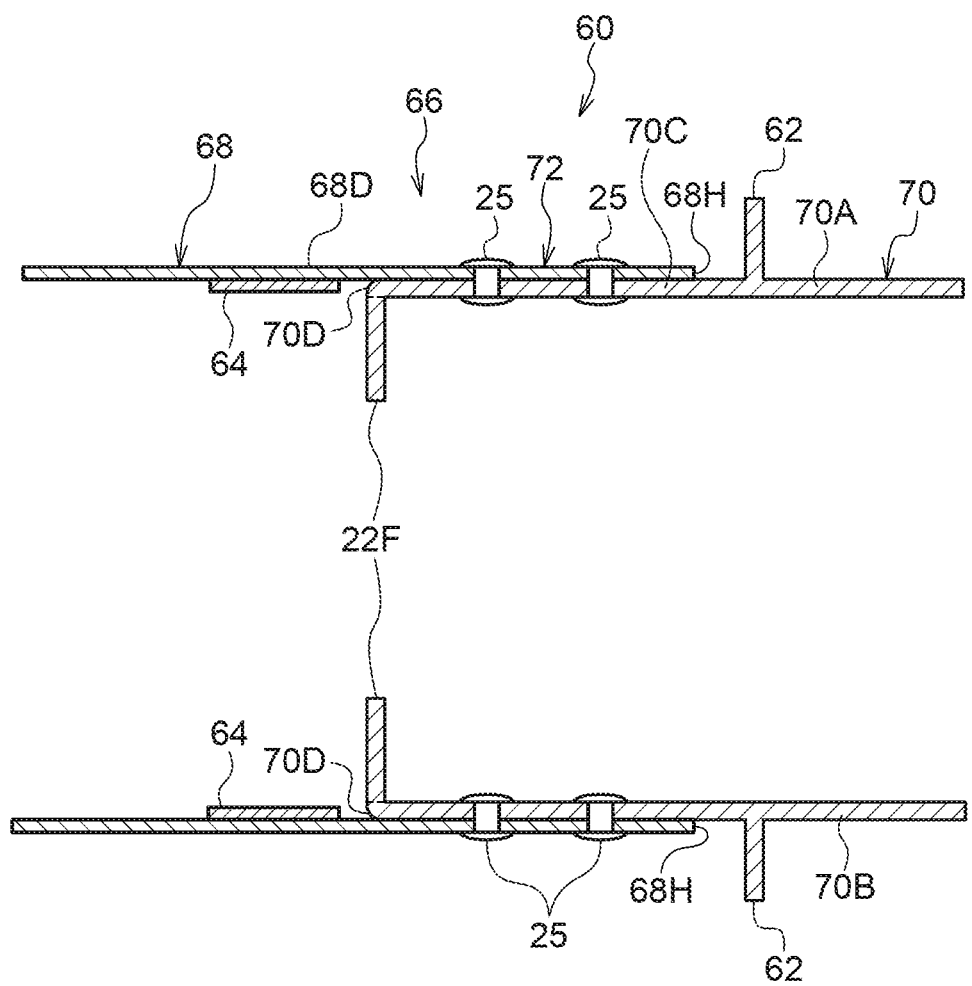
FIG. 7 is a cross-sectional view corresponding to FIG. 4, illustrating a vehicle body structure according to the second exemplary embodiment.

Explanation follows regarding a vehicle body structure according to a second exemplary embodiment of the present disclosure, with reference to FIG. 6 and FIG. 7. Configuration sections that are the same as those in the first exemplary embodiment described above are allocated the same reference numerals, and explanation thereof is omitted.

A vehicle body structure 60 according to the second exemplary embodiment is basically similar to the first exemplary embodiment. However, a load transmission portion 62 is provided to a rear side member rear portion 70, and reinforcement members 64 is provided to a rear side member front portion 68.

Namely, as illustrated in FIG. 7, a pair of left and right rear side members 66 are provided at the vehicle rear side and vehicle width direction inner side of the rockers 14 (see FIG. 5). Each of the rear side members 66 is provided extending along the vehicle front-rear direction and toward the vehicle upper side on progression toward the vehicle rear side, and includes the rear side member front portion 68, serving as a second vehicle body framework member configuring a vehicle front section, and the rear side member rear portion 70, serving as a first vehicle body framework member configuring a vehicle rear section. The rear side member front portion 68 and the corresponding rear side member rear portion 70 are joined together through a join location 72, described later.

As illustrated in FIG. 6, each of the rear side member front portions 68 is manufactured from sheet steel and has a substantially U-shaped cross-section profile open toward the vehicle width direction outer side as sectioned orthogonally to its length direction. Specifically, the rear side member front portion 68 is configured including an upper wall portion 68A provided at the vehicle upper side with its thickness direction substantially along the vehicle vertical direction, a lower wall portion 68B opposing the upper wall portion 68A along the vehicle vertical direction, and a vehicle width direction inner wall portion 68C coupling a vehicle width direction inner end portion of the upper wall portion 68A and a vehicle width direction inner end portion of the lower wall portion 68B together substantially along the vehicle vertical direction. A non-illustrated front end portion of the rear side member front portion 68 is superimposed on and joined to the rear end portion 14A of the corresponding rocker 14 (see FIG. 5) from the vehicle width direction inner side through a non-illustrated weld portion, so as to cover the rear end portion 14A of the rocker 14.

As illustrated in FIG. 7, the plural reinforcement members 64 are provided to a rear end portion 68D of the rear side member front portion 68 on the side away from the rear side member rear portion 70 relative to the join location 72. As illustrated in FIG. 6, the respective reinforcement members 64 are provided at positions corresponding to a first ridge line 68E formed between the upper wall portion 68A and the vehicle width direction inner wall portion 68C, and a second ridge line 68F formed between the vehicle width direction inner wall portion 68C and the lower wall portion 68B. Specifically, of the plural reinforcement members 64, the reinforcement member 64 provided at the vehicle upper side (referred to hereafter simply as the "upper reinforcement member 64") is formed in a substantially L-shape in front view of the vehicle, by a first reinforcement member configuration section 64A formed in a plate shape joined to a vehicle lower side face of the upper wall portion 68A with its thickness direction substantially along the vehicle vertical direction, and a second reinforcement member configuration section 64B formed in a plate shape extending toward the vehicle lower side from a vehicle width direction inner end portion of the first reinforcement member configuration section 64A with its thickness direction along the vehicle width direction, and joined to a vehicle width direction outer side face of the vehicle width direction inner wall portion 68C. Moreover, of the plural reinforcement members 64, the reinforcement member 64 provided at the vehicle lower side (referred to hereafter simply as the "lower reinforcement member 64") is formed with vertical direction symmetry to the upper reinforcement member 64, such that the first reinforcement member configuration section 64A of the lower reinforcement member 64 is joined to a vehicle upper side face of the lower wall portion 68B. The second reinforcement member configuration section 64B of the lower reinforcement member 64 extends from a vehicle width direction inner end portion of the first reinforcement member configuration section 64A of the lower reinforcement member 64 toward the vehicle upper side, and is joined to the vehicle width direction outer side face of the vehicle width direction inner wall portion 68C.

Note that the pair of left and right rear side member front portions 68 are coupled together in the vehicle width direction by the center cross member 46 (see FIG. 5) that configures the framework of the vehicle body lower section, similarly to in the first exemplary embodiment.

The rear side member rear portion 70 illustrated in FIG. 7 is manufactured by die-casting and, similarly to the rear side member front portion 68, has a substantially U-shaped cross-section profile open toward the vehicle width direction outer side as sectioned orthogonally to its length direction. Specifically, the rear side member rear portion 70 is configured including an upper wall portion 70A provided at the vehicle upper side with its thickness direction substantially along the vehicle vertical direction, a lower wall portion 70B opposing the upper wall portion 70A along the vehicle vertical direction, and a non-illustrated vehicle width direction inner wall portion coupling a vehicle width direction inner end portion of the upper wall portion 70A and a vehicle width direction inner end portion of the lower wall portion 70B together substantially in the vehicle vertical direction. The rear end portion 68D of the rear side member front portion 68 is superimposed on a front end portion 70C of the corresponding rear side member rear portion 70 so as to cover the front end portion 70C, and joined thereto by plural SPRs 25. In other words, a location where the front end portion 70C of the rear side member rear portion 70 and the rear end portion 68D of the corresponding rear side member front portion 68 are joined together corresponds to the join location 72.

The front end portion 70C of the rear side member rear portion 70 is provided with flanges 22F that continue from an end face 70D of the rear side member rear portion 70 so as to project toward the interior of the cross-section of the rear side member rear portion 70, each of the flanges 22F having a thickness direction substantially along the vehicle front-rear direction.

The load transmission portion 62 is provided to the join location 72 at the front end portion 70C of the rear side member rear portion 70 on the side away from the rear side member front portion 68 relative to the join location 72. The load transmission portion 62 has a thickness direction substantially along the vehicle front-rear direction, and projects from the upper wall portion 70A, the lower wall portion 70B, and the vehicle width direction inner wall portion of the rear side member rear portion 70 toward the exterior of the cross-section as sectioned orthogonally to the length direction of the rear side member rear portion 70. Accordingly, the load transmission portion 62 opposes an end face 68H of the rear end portion 68D of the corresponding rear side member front portion 68 substantially along the vehicle front-rear direction.

The pair of left and right rear side member rear portions 70 are coupled together in the vehicle width direction by the first rear cross member 48 and the second rear cross member 50 (see FIG. 5) that configure the framework of the vehicle body lower section, similarly to in the first exemplary embodiment.

Explanation follows regarding operation of the second exemplary embodiment.

The configured described above is similar to that of the vehicle body structure 10 of the first exemplary embodiment, with the exception of the points that the load transmission portion 62 is provided to the rear side member rear portion 70, and the reinforcement members 64 are provided to the rear side member front portion 68. Accordingly, similar effects to those of the first exemplary embodiment may be obtained. Moreover, the load transmission portion 62 provided to each of the rear side member rear portions 70 is provided outside the cross-section of the rear side member rear portion 70 as sectioned orthogonally to the length direction of the rear side member rear portion 70. Thus, when the join comes apart at the join location 72 between the rear side member rear portion 70 and the corresponding rear side member front portion 68 in a rear collision, the end face 68H of the rear side member front portion 68 that is joined to the front end portion 70C of the rear side member rear portion 70 so as to cover the front end portion 70C is capable of abutting the load transmission portion 62. Any further relative movement between the rear side member rear portion 70 and the rear side member front portion 68 may be suppressed. Moreover, as illustrated in FIG. 6, deformation of the first ridge line 68E and the second ridge line 68F may be suppressed due to joining the reinforcement members 64 to the rear side member front portion 68 at locations corresponding to the first ridge line 68E and the second ridge line 68F. Accordingly, collision load passing through the load transmission portion 62 located between the rear side member rear portion 70 and the rear side member front portion 68 can be transmitted through the first ridge line 68E and the second ridge line 68F, which have higher bending rigidity than other locations, thereby enabling collision load to be transmitted efficiently. This may enable deformation of the vehicle body 16 in a vehicle collision to be further suppressed.

Note that although the reinforcement members 64 are provided corresponding to the first ridge line 68E and the second ridge line 68F in the exemplary embodiment described above as illustrated in FIG. 6, there is no limitation thereto. The reinforcement member 64 may be provided only to a location corresponding to at least one out of the first ridge line 68E or the second ridge line 68F, or the reinforcement member 64 may be provided corresponding to another ridge line.

Although the rear end portion 68D of the rear side member front portion 68 is configured so as to cover the front end portion 70C of the corresponding rear side member rear portion 70 as illustrated in FIG. 7 in the present exemplary embodiment, there is no limitation thereto. At least a portion of the rear end portion 68D of the rear side member front portion 68 may cover the front end portion 70C of the rear side member rear portion 70.

Third Exemplary Embodiment

Figure 8:
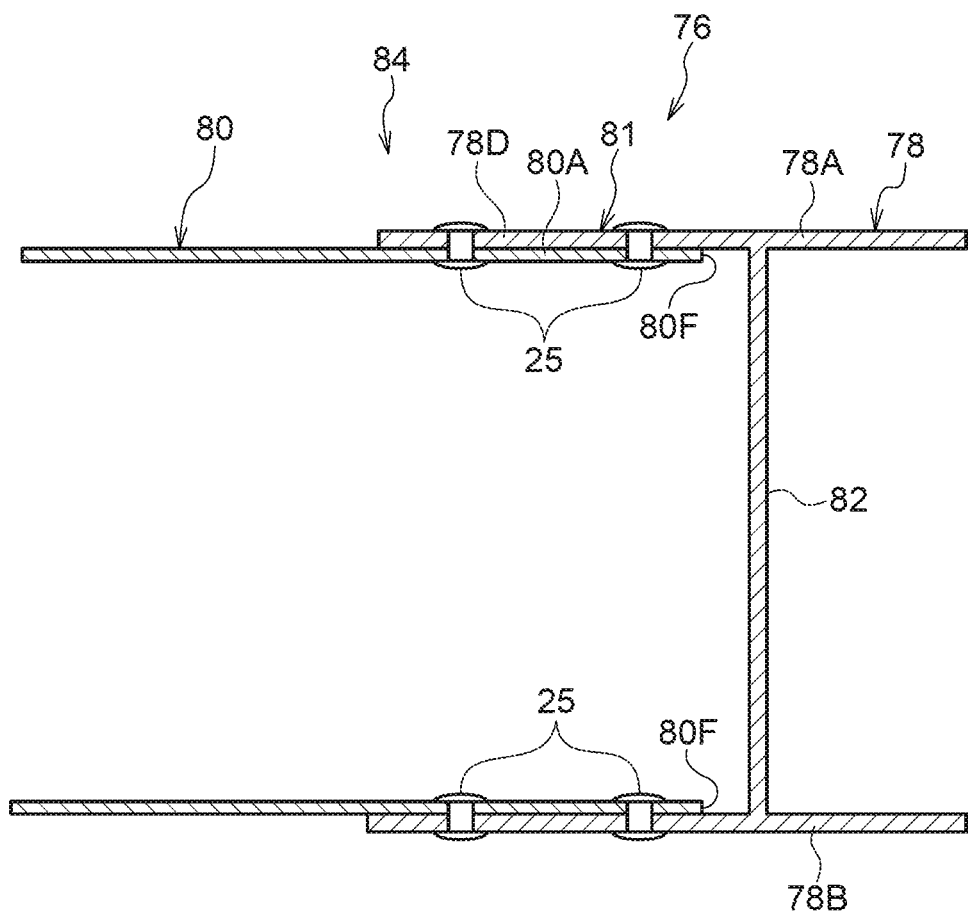
FIG. 8 is a cross-sectional view corresponding to FIG. 4, illustrating a vehicle body structure according to a third exemplary embodiment.

Explanation follows regarding a vehicle body structure according to a third exemplary embodiment of the present disclosure, with reference to FIG. 8 and FIG. 9. Configuration sections that are the same as those in the first exemplary embodiment and so on described above are allocated the same reference numerals, and explanation thereof is omitted.

A vehicle body structure 76 according to the third exemplary embodiment is basically similar to the first exemplary embodiment. However, a rear side member rear portion 78 is joined to a rear end portion 80A of a rear side member front portion 80 so as to cover the rear end portion 80A.

Namely, as illustrated in FIG. 8, a pair of left and right rear side members 84 are provided at the vehicle rear side and vehicle width direction inner side of the rockers 14 (see FIG. 5). Each of the rear side members 84 is provided extending along the vehicle front-rear direction and toward the vehicle upper side on progression toward the vehicle rear side, and includes the rear side member front portion 80, serving as a second vehicle body framework member configuring a vehicle front section, and the rear side member rear portion 78 serving as a first vehicle body framework member configuring a vehicle rear section. The rear side member front portion 80 and the rear side member rear portion 78 are joined together through a join location 81, described later.

As illustrated in FIG. 9, each of the rear side member front portions 80 is manufactured from sheet steel and has a substantially U-shaped cross-section profile open toward the vehicle width direction outer side as sectioned orthogonally to its length direction. Specifically, the rear side member front portion 80 is configured including an upper wall portion 80B provided at the vehicle upper side with its thickness direction substantially along the vehicle vertical direction, a lower wall portion 80C (opposing the upper wall portion 80B along the vehicle vertical direction, and a vehicle width direction inner wall portion 80D coupling a vehicle width direction inner end portion of the upper wall portion 80B and a vehicle width direction inner end portion of the upper wall portion 80C together substantially in the vehicle vertical direction. A non-illustrated front end portion of the rear side member front portion 80 is superimposed on the rear end portion 14A of the corresponding rocker 14 (see FIG. 5) so as to cover the rear end portion 14A from the vehicle width direction inner side, and is joined thereto at non-illustrated weld portion.

Note that the pair of left and right rear side member front portions 80 are coupled together in the vehicle width direction by the center cross member 46 (see FIG. 5) that configures the framework of the vehicle body lower section, similarly to in the first exemplary embodiment.

Each of the rear side member rear portions 78 is manufactured by die-casting and, similarly to the rear side member front portion 80, has a substantially U-shaped cross-section profile open toward the vehicle width direction outer side as sectioned orthogonally to its length direction. Specifically, the rear side member rear portion 78 is configured including an upper wall portion 78A provided at the vehicle upper side with its thickness direction substantially along the vehicle vertical direction, a lower wall portion 78B opposing the upper wall portion 78A in the vehicle vertical direction, and a vehicle width direction inner wall portion 78C coupling a vehicle width direction inner end portion of the upper wall portion 78A and a vehicle width direction inner end portion of the lower wall portion 78B together substantially in the vehicle vertical direction. As illustrated in FIG. 8, a front end portion 78D of the rear side member rear portion 78 is superimposed on the rear end portion 80A of the corresponding rear side member front portion 80 so as to cover the rear end portion 80A, and is joined thereto by plural SPRs 25. In other words, a location where the front end portion 78D of the rear side member rear portion 78 and the rear end portion 80A of the rear side member front portion 80 are joined together corresponds to the join location 81.

A load transmission portion 82 is provided at the front end portion 78D of the rear side member rear portion 78 on the side away from the rear side member front portion 20 relative to the join location 81. The load transmission portion 82 has a thickness direction substantially along the vehicle front-rear direction, and is configured so as to project toward the interior of the cross-section as sectioned orthogonally to the length direction of the rear side member rear portion 78 from the upper wall portion 78A, the lower wall portion 78B, and the vehicle width direction inner wall portion 78C of the rear side member rear portion 78 (see FIG. 9). The load transmission portion 82 is thus configured opposing an end face 80F of the rear end portion 80A of the rear side member front portion 80 substantially along the vehicle front-rear direction.

The pair of left and right rear side member rear portions 78 are coupled together in the vehicle width direction by the first rear cross member 48 and the second rear cross member 50 (see FIG. 5) that configure the framework of the vehicle body lower section, similarly to in the first exemplary embodiment.

Explanation follows regarding operation of the third exemplary embodiment.

The configuration described above is similar to that of the vehicle body structure 10 of the first exemplary embodiment with the exception of the point that the rear side member rear portion 78 is joined to the rear end portion 80A of the corresponding rear side member front portion 80 so as to cover the rear end portion 80A. Accordingly, similar effects to those of the first exemplary embodiment may be obtained. Moreover, the load transmission portion 82 is provided inside the cross-section of each of the rear side member rear portions 78 as sectioned orthogonally to the length direction of the rear side member rear portion 78. Accordingly, interference between the load transmission portion 82 and other components disposed in the vicinity of the rear side member rear portion 78 may be suppressed. Namely, the degrees of freedom for component layout may be improved.

Note that although the front end portion 78D of the rear side member rear portion 78 is configured so as to cover the rear end portion 80A of the corresponding rear side member front portion 80 in the present exemplary embodiment, there is no limitation thereto. At least a portion of the front end portion 78D of the rear side member rear portion 78 may cover the rear end portion 80A of the rear side member front portion 80.

Fourth Exemplary Embodiment

Figure 10:
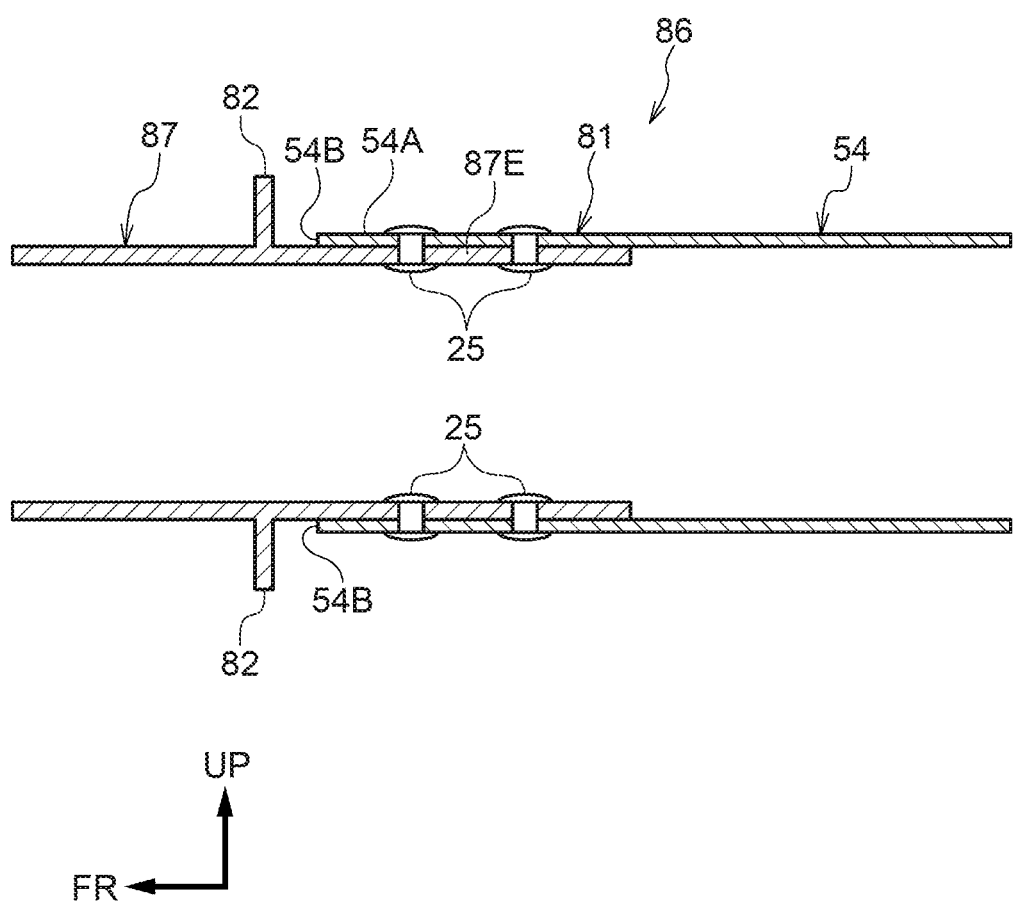
FIG. 10 is a cross-sectional view illustrating a vehicle body structure according to a fourth exemplary embodiment in a state sectioned along line D-D in FIG. 5.

Explanation follows regarding a vehicle body structure according to a fourth exemplary embodiment of the present disclosure, with reference to FIG. 9 and FIG. 10. Configuration sections that are the same as those in the first exemplary embodiment and so on described above are allocated the same reference numerals, and explanation thereof is omitted.

A vehicle body structure 86 according to the fourth exemplary embodiment is basically similar to the first exemplary embodiment. However, a rear side member rear portion 87, serving as a first vehicle body framework member, to which the corresponding rear floor side member 54 serving as a second vehicle body framework member is joined.

Figure 11:
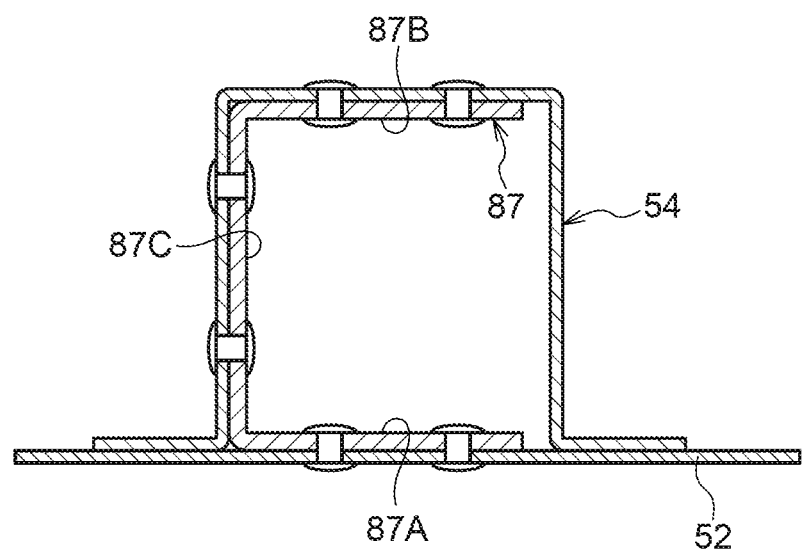
FIG. 11 is a cross-sectional view illustrating a vehicle body structure according to the fourth exemplary embodiment in a state sectioned along line E-E in FIG. 5.

Namely, as illustrated in FIG. 10, the pair of rear floor side members 54 on which the rear floor panel 52 (see FIG. 5) configuring the floor surface in the vehicle rear section is placed and that extend along the vehicle front-rear direction as far as the rear end of the vehicle body are joined to rear end portions 87E of the rear side member rear portions 87. As an example, each of the rear floor side members 54 is each configured with a hat shaped cross-section profile opening toward the rear floor panel 52 as sectioned along the vehicle front-rear direction, and is joined to the lower face of the rear floor panel 52 by welding or the like, as illustrated in FIG. 11. Each of the rear floor side members 54 thus forms a closed cross-section structure with the rear floor panel 52.

Each of the rear side member rear portions 87 is manufactured by die-casting and has a substantially U-shaped cross-section profile open toward the vehicle width direction outer side as sectioned orthogonally to its length direction. Specifically, the rear side member rear portion 87 is configured including an upper wall portion 87A provided at the vehicle upper side with its thickness direction substantially along the vehicle vertical direction, a lower wall portion 87B opposing the upper wall portion 87A along the vehicle vertical direction, and a vehicle width direction inner wall portion 87C coupling a vehicle width direction inner end portion of the upper wall portion 87A and a vehicle width direction inner end portion of the lower wall portion 87B together substantially in the vehicle vertical direction. Moreover, as illustrated in FIG. 10, a front end portion 54A of the rear floor side member 54 is superimposed on the rear end portion 87E of the corresponding rear side member rear portion 87 as to cover the rear end portion 87E, and is joined thereto by plural SPRs 25. In other words, a location where the rear end portion 87E of the rear side member rear portion 87 and the front end portion 54A of the rear floor side member 54 are joined together corresponds to the join location 81.

The load transmission portion 82 is provided at the rear end portion 87E of the rear side member rear portion 87 on the side away from the corresponding rear floor side member 54 relative to the join location 81. The load transmission portion 82 has a thickness direction substantially along the vehicle front-rear direction, and is configured so as to project toward the exterior of the cross-section of the rear side member rear portion 87 as sectioned orthogonally to the length direction of the rear side member rear portion 87 from the upper wall portion 87A, the lower wall portion 87B, and the vehicle width direction inner wall portion 87C of the rear side member rear portion 87 (see FIG. 11) (the load transmission portion 82 at the vehicle width direction inner wall portion 87C is not illustrated in the drawings). The load transmission portion 82 is thus configured opposing an end face 54B of the front end portion 54A of the corresponding rear floor side member 54 substantially along the vehicle front-rear direction.

The pair of left and right rear side member rear portions 87 are coupled together in the vehicle width direction by the first rear cross member 48 and the second rear cross member 50 (see FIG. 5) that configure the framework of the vehicle body lower section, similarly to in the first exemplary embodiment.

Explanation follows regarding operation of the fourth exemplary embodiment.

The configuration described above is similar to that of the vehicle body structure 10 of the first exemplary embodiment, with the exception of the point that the rear floor side member 54 serving as a second vehicle body framework member is joined to the corresponding rear side member rear portion 87 serving as a first vehicle body framework member. Accordingly, similar effects to those of the first exemplary embodiment may be obtained. Moreover, since the load transmission portion 82 provided to each of the rear side member rear portions 87 is provided outside the cross-section sectioned orthogonally to the length direction of the rear side member rear portion 87, when the join comes apart at the join location 81 between the rear side member rear portion 87 and the corresponding rear floor side member 54 in a rear collision, the end face 54B of the rear floor side member 54 that is joined to the rear end portion 87E of the rear side member rear portion 87 so as to cover the rear end portion 87E is capable of abutting the load transmission portion 82. Accordingly, any further relative movement between the rear side member rear portion 87 and the rear floor side member 54 may be suppressed. Moreover, since the rear floor side member 54 is configured with a closed cross-section structure, the cross-section profile thereof is suppressed from changing when subjected to collision load. This may enable collision load to be transmitted efficiently between the rear side member rear portion 87 and the rear floor side member 54 through the load transmission portion 82. Accordingly, deformation of the vehicle body 16 in a vehicle collision may be further suppressed.

Note that although the front end portion 54A of the rear floor side member 54 is configured so as to cover the rear end portion 87E of the corresponding rear side member rear portion 87 in the present exemplary embodiment, there is no limitation thereto, and it is sufficient that at least a portion of the front end portion 54A of the rear floor side member 54 covers the rear end portion 87E of the rear side member rear portion 87.

Fifth Exemplary Embodiment

Explanation follows regarding a vehicle body structure according to a fifth exemplary embodiment of the present disclosure, with reference to FIG. 12 and FIG. 13. Configuration sections that are the same as those in the first and fourth exemplary embodiments and so on described above are allocated the same reference numerals, and explanation thereof is omitted.

A vehicle body structure 88 according to the fifth exemplary embodiment is basically similar to the first and fourth exemplary embodiments. However, a load transmission portion 90, serving as a first vehicle body framework member, is provided within a rear side member rear portion 92.

Namely, as illustrated in FIG. 12, the rear floor panel 52 (see FIG. 5) is placed on a pair of rear floor side members 94. Each of the rear floor side members 94 serves as a second vehicle body framework member that extends along the vehicle front-rear direction as far as the rear end of the vehicle body and is joined to a rear end portion 92A of the corresponding rear side member rear portion 92. As an example, each of the rear floor side members 94 has a cross-section profile configuring a rectangular closed cross-section structure as sectioned along the vehicle front-rear direction as illustrated in FIG. 13.

Each of the rear side member rear portions 92 is manufactured by die-casting and has a substantially U-shaped cross-section profile open toward the vehicle width direction outer side as sectioned orthogonally to its length direction. Specifically, the rear side member rear portion 92 is configured including an upper wall portion 92B provided at the vehicle upper side with its thickness direction substantially along the vehicle vertical direction, a lower wall portion 92C opposing the upper wall portion 928 along the vehicle vertical direction, and a vehicle width direction inner wall portion 92D coupling a vehicle width direction inner end portion of the upper wall portion 92B and a vehicle width direction inner end portion of the lower wall portion 92C together substantially in the vehicle vertical direction. Moreover, as illustrated in FIG. 12, the rear end portion 92A of the rear side member rear portion 92 is superimposed on a front end portion 94A of the corresponding rear floor side member 94 so as to cover the front end portion 94A, and is joined thereto by plural SPRs 25 (see also FIG. 12). In other words, a location where the rear end portion 92A of the rear side member rear portion 92 and the front end portion 94A of the rear floor side member 94 are joined together corresponds to a join location 96.

The load transmission portion 90 is provided at the rear end portion 92A of the rear side member rear portion 92 on the side away from the rear floor side member 94 relative to the join location 96. The load transmission portion 90 is formed in a plate shape with its thickness direction substantially along the vehicle front-rear direction, and is provided inside the cross-section of the rear side member rear portion 92 as sectioned orthogonally to the length direction of the rear side member rear portion 92. The load transmission portion 90 is thus configured opposing an end face 94B of the front end portion 94A of the corresponding rear floor side member 94 substantially along the vehicle front-rear direction.

The pair of left and right rear side member rear portions 92 are coupled in the vehicle width direction together by the first rear cross member 48 and the second rear cross member 50 that configure the framework of the vehicle body lower section, similarly to in the first exemplary embodiment.

Explanation follows regarding operation of the fifth exemplary embodiment.

The configuration described above is similar to that of the vehicle body structure 10 of the first exemplary embodiment, with the exception of the point that the load transmission portion 90 is provided within each of the rear side member rear portions 92 serving as a first vehicle body framework member. Accordingly, similar effects to those of the first and fourth exemplary embodiments may be obtained. Moreover, since the load transmission portion 90 provided to the rear side member rear portion 92 is provided inside the cross-section of the rear side member rear portion 92 as sectioned orthogonally to the length direction of the rear side member rear portion 92, when the join comes apart at the join location 96 between the rear side member rear portion 92 and the corresponding rear floor side member 94 in a rear collision, the end face 94B of the rear floor side member 94 that is joined to the rear end portion 92A of the rear side member rear portion 92 so as to be covered by the rear end portion 92A is capable of abutting the load transmission portion 90. Accordingly, any further relative movement between the rear side member rear portion 92 and the rear floor side member 94 may be suppressed. Moreover, since the rear floor side member 94 is configured with a closed cross-section structure, the cross-section profile thereof may be suppressed from changing when subjected to collision load. This may enable collision load to be transmitted efficiently between the rear side member rear portion 92 and the rear floor side member 94 through the load transmission portion 90. Accordingly, deformation of the vehicle body 16 in a vehicle collision may be further suppressed.

Note that, in the present exemplary embodiment, although a case in which the rear end portion 92A of the rear side member rear portion 92 is configured so as to cover the front end portion 94A of the corresponding rear floor side member 94, has been described, there is no limitation thereto. At least a portion of the rear end portion 92A of the rear side member rear portion 92 may cover the front end portion 94A of the rear floor side member 94.

In the first to the fifth exemplary embodiments described above, although the first vehicle body framework member is configured by the rear side member rear portion 22, 70, 78, 92, and the second vehicle body framework member is configured by the rear side member front portion 20, 68, 80 or the rear floor side member 54, 94 there is no limitation thereto. Other framework members such as the rockers 14 may be applied.

The present disclosure is not limited to the exemplary embodiments described above, and obviously various other modifications to the above exemplary embodiments may be implemented within a range not departing from the spirit of the present disclosure.

What is claimed is:

1. A vehicle body structure comprising:
   a pair of left and right first vehicle body framework members manufactured by die-casting, the pair of left and right first vehicle body framework members being provided at vehicle width direction outer sides of a vehicle and extending along a vehicle front-rear direction;
   a pair of left and right second vehicle body framework members manufactured from sheet steel, the pair of left and right second vehicle body framework members being joined to a length direction end portion of a corresponding first vehicle body framework member and extending along the vehicle front-rear direction; and
   a load transmission portion provided at either the first vehicle body framework members or the second vehicle body framework members, the load transmission portion being spaced apart from the other of the first vehicle body framework members or the second vehicle body framework members, the load transmission portion configured to abut the other the first vehicle body framework members or the second vehicle body framework members when a collision load acting substantially along the vehicle front-rear direction is input to the first vehicle body framework members or the second vehicle body framework members.

2. The vehicle body structure of claim 1, wherein:
   each of the second vehicle body framework members is joined to a length direction end portion of the corresponding first vehicle body framework member to cover at least a portion of the end portion of the first vehicle body framework member,
   the load transmission portion is provided at the second vehicle body framework member, at a side away from the first vehicle body framework member relative to a position where the first vehicle body framework member is joined to the second vehicle body framework member, and is provided inside a cross-section of the second vehicle body framework member as sectioned orthogonally to a length direction of the second vehicle body framework member, and
   the load transmission portion includes joint portions joined to a plurality of at least two wall portions configuring the second vehicle body framework member as viewed in this cross-section, and an abutting portion that links the joint portions together.

3. The vehicle body structure of claim 2, wherein the joint portions of the load transmission portion are provided at a side away from the first vehicle body framework member relative to the abutting portion.

4. The vehicle body structure of claim 1, wherein:
each of the second vehicle body framework members is configured with a closed cross-section structure, and is joined to a length direction end portion of the corresponding first vehicle body framework member to cover at least a portion of the end portion of the first vehicle body framework member, and
the load transmission portion is provided at the corresponding first vehicle body framework member, at a side away from the second vehicle body framework member relative to a position where the second vehicle body framework member is joined to the first vehicle body framework member, and is provided outside a cross-section of the first vehicle body framework member as sectioned orthogonally to a length direction of the first vehicle body framework member.

5. The vehicle body structure of claim 1, wherein:
each of the second vehicle body framework members is joined to a length direction end portion of the corresponding first vehicle body framework member to cover at least a portion of the end portion of the first vehicle body framework member;
the load transmission portion is provided at the corresponding first vehicle body framework member, at a side away from the second vehicle body framework member relative to a position where the second vehicle body framework member is joined to the first vehicle body framework member, and is provided outside a cross-section of the first vehicle body framework member as sectioned orthogonally to a length direction of the first vehicle body framework member, and
a reinforcement member is joined to the second vehicle body framework member at a location corresponding to at least one ridge line of the second vehicle body framework member.

6. The vehicle body structure of claim 4, wherein:
each of the second vehicle body framework members is joined to a length direction end portion of the corresponding first vehicle body framework member to cover at least a portion of the end portion of the first vehicle body framework member;
the load transmission portion is provided at the corresponding first vehicle body framework member, at a side away from the second vehicle body framework member relative to a position where the second vehicle body framework member is joined to the first vehicle body framework member, and is provided outside a cross-section of the first vehicle body framework member as sectioned orthogonally to a length direction of the first vehicle body framework member, and
a reinforcement member is joined to the second vehicle body framework member at a location corresponding to at least one ridge line of the second vehicle body framework member.

7. The vehicle body structure of claim 1, wherein:
each of the first vehicle body framework members is joined to a length direction end portion of the corresponding second vehicle body framework member configured with a closed cross-section structure to cover at least a portion of the end portion of the second vehicle body framework member; and
the load transmission portion is provided to the corresponding first vehicle body framework member at a side away from the second vehicle body framework member relative to a position where the second vehicle body framework member is joined to the first vehicle body framework member, and is provided inside a cross-section of the first vehicle body framework member as sectioned orthogonally to a length direction of the first vehicle body framework member.

8. A vehicle body structure comprising:
a pair of left and right first vehicle body framework members manufactured by die-casting, the pair of left and right first vehicle body framework members being provided at vehicle width direction outer sides of a vehicle and extending along a vehicle front-rear direction;
a pair of left and right second vehicle body framework members manufactured from sheet steel, the pair of left and right second vehicle body framework members being joined to a length direction end portion of a corresponding first vehicle body framework member and extending along the vehicle front-rear direction; and
a load transmission portion provided at either the first vehicle body framework members or the second vehicle body framework members, the load transmission portion configured to abut the other the first vehicle body framework members or the second vehicle body framework members when a collision load acting substantially along the vehicle front-rear direction is input to the first vehicle body framework members or the second vehicle body framework members, wherein:
each of the second vehicle body framework members is joined to a length direction end portion of the corresponding first vehicle body framework member to cover at least a portion of the end portion of the first vehicle body framework member,
the load transmission portion is provided at the second vehicle body framework member, at a side away from the first vehicle body framework member relative to a position where the first vehicle body framework member is joined to the second vehicle body framework member, and is provided inside a cross-section of the second vehicle body framework member as sectioned orthogonally to a length direction of the second vehicle body framework member, and
the load transmission portion includes joint portions joined to a plurality of at least two wall portions configuring the second vehicle body framework member as viewed in this cross-section, and an abutting portion that links the joint portions together.

9. The vehicle body structure of claim 8, wherein the joint portions of the load transmission portion are provided at a side away from the first vehicle body framework member relative to the abutting portion.

10. A vehicle body structure comprising:
a pair of left and right first vehicle body framework members manufactured by die-casting, the pair of left and right first vehicle body framework members being provided at vehicle width direction outer sides of a vehicle and extending along a vehicle front-rear direction;
a pair of left and right second vehicle body framework members manufactured from sheet steel, the pair of left and right second vehicle body framework members being joined to a length direction end portion of a corresponding first vehicle body framework member and extending along the vehicle front-rear direction; and a load transmission portion provided at either the first vehicle body framework members or the second vehicle body framework members, the load transmission portion configured to abut the other the first vehicle body framework members or the second vehicle body framework members when a collision load acting substantially along the vehicle front-rear direction is input to the first vehicle body framework members or the second vehicle body framework members, wherein:

each of the second vehicle body framework members is configured with a closed cross-section structure, and is joined to a length direction end portion of the corresponding first vehicle body framework member to cover at least a portion of the end portion of the first vehicle body framework member, and the load transmission portion is provided at the corresponding first vehicle body framework member, at a side away from the second vehicle body framework member relative to a position where the second vehicle body framework member is joined to the first vehicle body framework member, and is provided outside a cross-section of the first vehicle body framework member as sectioned orthogonally to a length direction of the first vehicle body framework member.

11. The vehicle body structure of claim 10, wherein:

a reinforcement member is joined to the second vehicle body framework member at a location corresponding to at least one ridge line of the second vehicle body framework member.

* * * * *